(12) United States Patent
Lawless

(10) Patent No.: US 6,966,526 B2
(45) Date of Patent: Nov. 22, 2005

(54) DRAGLESS FLIGHT CONTROL SYSTEM FOR FLYING OBJECTS

(75) Inventor: Daniel F. Lawless, Hazel Green, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/040,302

(22) Filed: Jan. 13, 2005

(65) Prior Publication Data

US 2005/0236514 A1    Oct. 27, 2005

Related U.S. Application Data

(62) Division of application No. 10/722,629, filed on Nov. 28, 2003.

(51) Int. Cl.[7] ............................................. B64C 23/00
(52) U.S. Cl. ...................................... 244/201; 244/199
(58) Field of Search ............................ 244/3.21, 3.24, 244/3.27, 3.28, 3.29, 199, 201

(56) References Cited

U.S. PATENT DOCUMENTS

| | | | | |
|---|---|---|---|---|
| 3,010,677 A | * | 11/1961 | Guthrie et al. ............. | 244/3.16 |
| 3,188,958 A | * | 6/1965 | Burke et al. ............... | 244/3.14 |
| 4,113,204 A | * | 9/1978 | Leek .......................... | 244/3.21 |
| 5,088,658 A | * | 2/1992 | Forsmo ...................... | 244/3.21 |
| 5,094,406 A | * | 3/1992 | Shafer ........................ | 244/3.21 |
| 5,582,364 A | * | 12/1996 | Trulin et al. ............... | 244/3.29 |
| 5,590,850 A | * | 1/1997 | Cannon et al. ............. | 244/3.15 |
| 6,581,871 B2 | * | 6/2003 | Pijaca et al. ............... | 244/3.27 |
| 6,604,705 B2 | * | 8/2003 | Pellegri et al. ............. | 244/3.24 |

* cited by examiner

Primary Examiner—Tien Dinh

(74) Attorney, Agent, or Firm—Hay Kyung Chang

(57) ABSTRACT

The Dragless Flight Control System for Flying Objects utilizes paired fins that are mounted to rotate in opposite directions. When no lift is desired during the object's flight, the fins are completely retracted into their housings that are recessed into the body of the object. This minimizes the drag. The fins are set to a maximum no-stall angle relative to the body axis of the flying object. To provide lift and other flight controls, such as roll and yaw, the fins are selectively exposed outside the exterior skin of the flying object by being rotated on their axes, the two fins in a pair always being rotated in opposite directions. Varying the amount of exposed area of the counter-rotating fins can generate lift effect that is proportional to the exposed area and similar to that produced by the current, permanently-extended standard rotational fins.

6 Claims, 6 Drawing Sheets

DRAGLESS FLIGHT CONTROL SYSTEM FOR FLYING OBJECTS

This application is filed under 37 C.F.R. 1.53 (b) as a divisional application of prior non-provisional application Ser. No. 10/722,629, filed on Nov. 28, 2003. Applicant hereby claims the benefit under 35 U.S.C. section 120 of said pending prior application. The said prior application is hereby incorporated herein by reference. The prior non-provisional application is currently pending in Group Art Unit 3644, Examiner Tien Quang Dinh.

DEDICATORY CLAUSE

The invention described herein may be manufactured, used and licensed by or for the Government for governmental purposes without the payment of any royalties to me.

BACKGROUND OF THE INVENTION

At present, no flying objects, such as missiles, utilize dual recessed fins (referred to as "canards" in cases of missiles) to control their flight.

In cases of missiles, for example, historically the flight control has been achieved by using the current standard rotational canard control. The current canard control typically involves multiple rigidly extended canards that are axially rotated about the canard axis, the canard axis being normal to the main longitudinal missile axis. Such standard rotational canard control generates large control forces because of the "lift" generated by angling the canards to a desired angle into the air flowing around the missile body during missile flight. But major limitations attend this type of control. The most substantial are the canard drag forces and the consequential limited control authority afforded during the boost phase of the missile. The drag added by the rigidly extended canards impacts the overall missile design, especially for those missiles required to carry large propellant loads because of the range to be covered. The currently-used extended-canard configuration severely reduces the missile range as well as speed. In cases of hypervelocity missiles, such as Compact Kinetic Energy Missile (C-KEM), the canard drag may nullify altogether the very advantage of maneuverability sought by using the canards.

SUMMARY OF THE INVENTION

The Dragless Flight Control System for Flying Objects, referred to as the DFCS, greatly minimizes drag and, as a result, reduces the total power loss suffered by the object during its flight. With the DFCS, drag exists only when the fins are proportionally extended for control purposes. When the object is set on its flying course, the fins are retracted completely into the body of the object, thus offering no resistance. Thus, the drag force exerted during the typical period that the fins are extended for control purposes is a mere fraction of the maximal drag force exerted by the permanently extended fins.

In DFCS, the retractable fins are mounted in pairs and are set to maximum no-stall angle 12 relative to axis 11 of flying object 100, the maximum angle being dependent on the operational speeds and the desired control characteristics of the particular object. The maximum angle is chosen to provide maximum lift over the range of the object's speeds while avoiding the loss of lift due to the stalling of the fin. The fins are selectively exposable outside exterior skin 8 of the flying object by being rotated on their axes, the two fins of a pair always being rotated by the same rotation angle but in opposite directions. The degree of fin exposure is determined by the degree of rotation angle, the rotation angle being changeable to vary the portion of the fin being exposed. Varying the exposed area of the counter-rotating fins can generate lift effect that is proportional to the exposed area and similar to that produced by the current extended standard rotational fins. When no lift force is needed, the fins retract into a position flush with the exterior skin of the flying object, thus offering no drag.

DESCRIPTION OF THE PREFERRED EMBODIMENT

Figure 1:
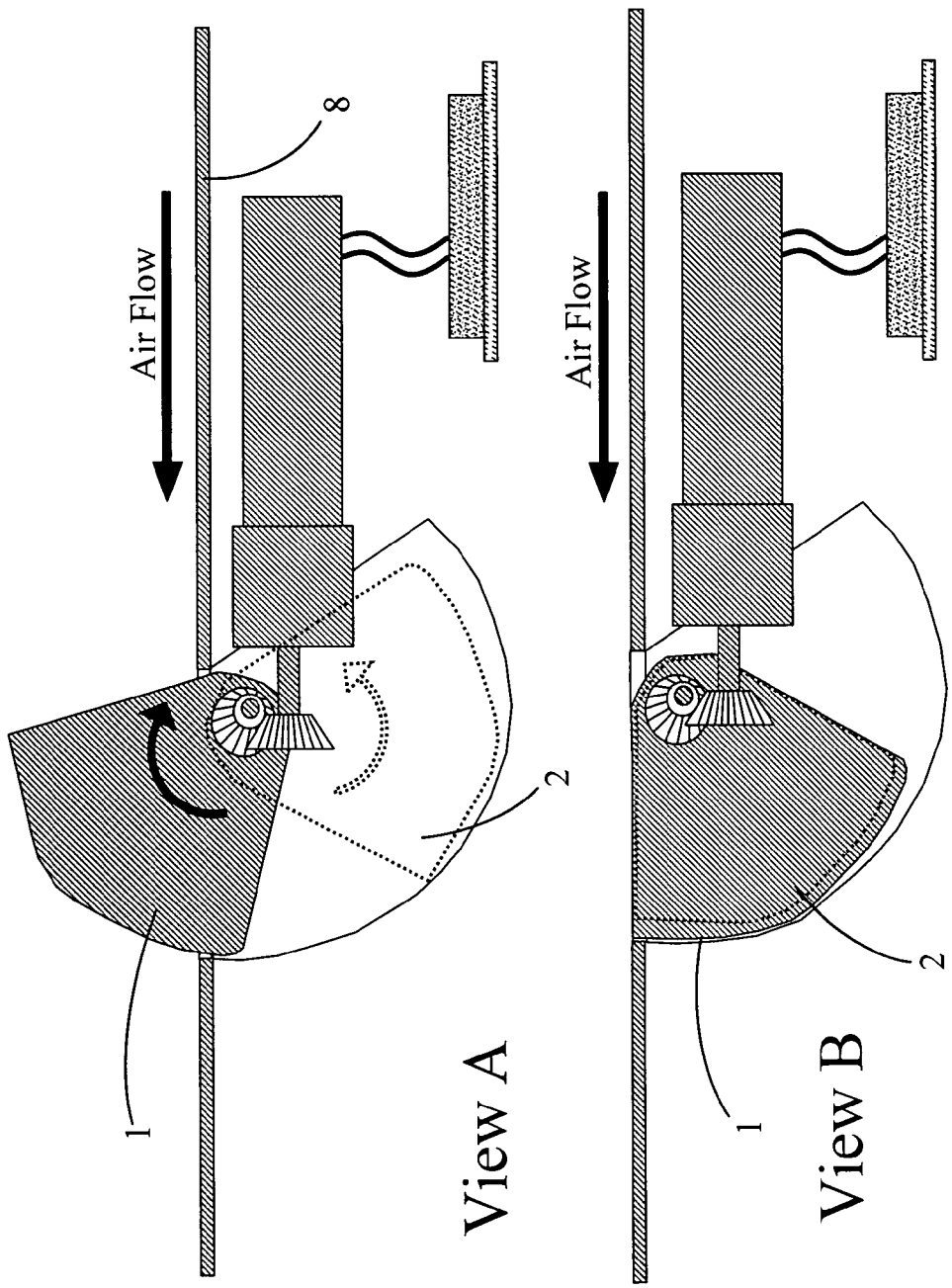
FIG. 1, views A and B present cross-sectional views of a representative pair of fins, with one fin fully-extended and with both fins retracted beneath exterior skin 8, respectively.

Referring now to the drawing wherein like numbers represent like parts in each of the several figures, the structure and operation of the DFCS is explained.

Figure 2:
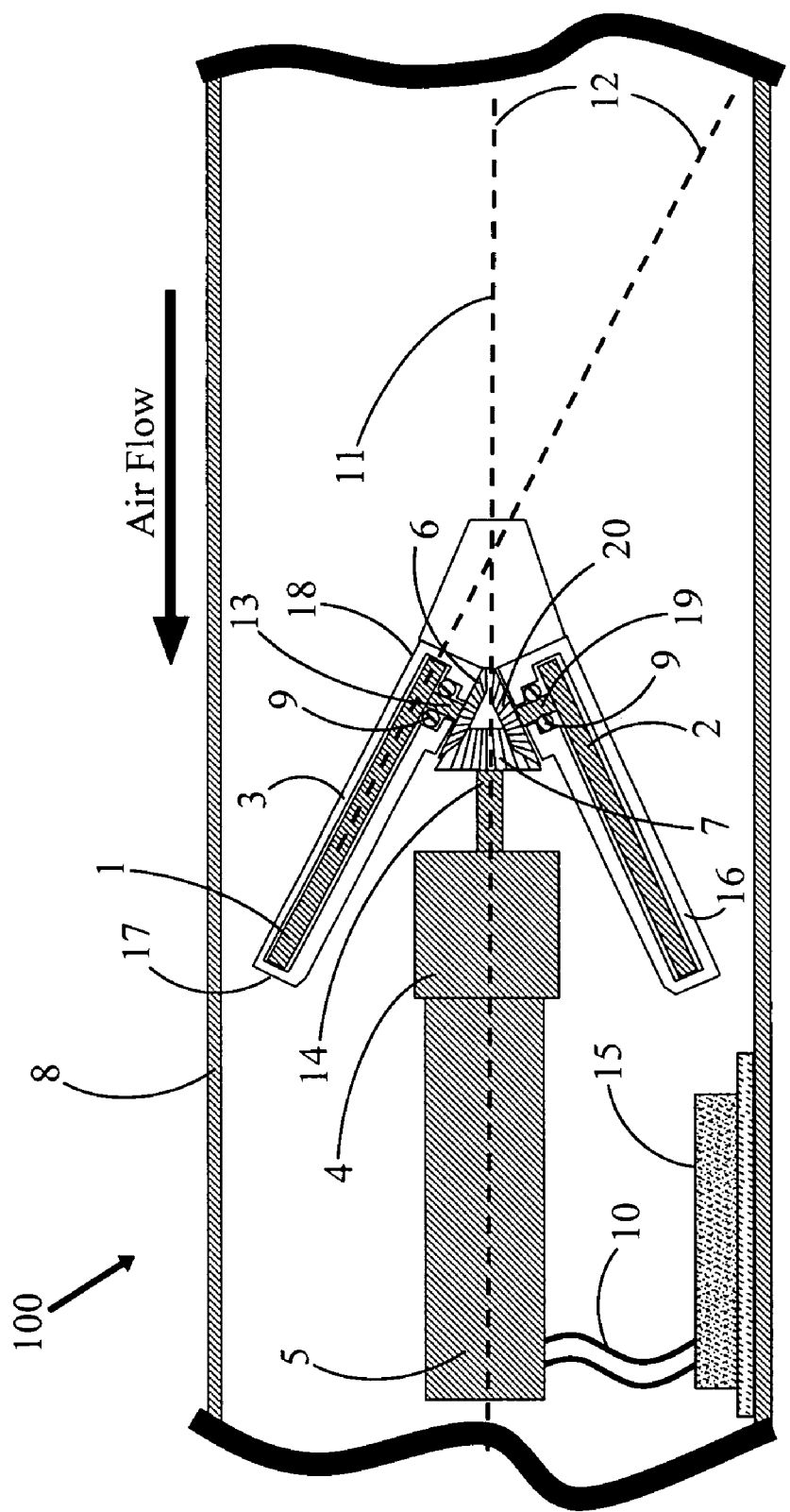
FIG. 2 depicts a preferred embodiment of the Dragless Flight Control System as it is positioned inside a flying object.

A typical flying object in which the DFCS may be employed is missile 100 having body axis 11 that is parallel with the length of the missile and a guidance computer (which may or may not be integral with controller 15) that, as a part of its guidance function, issues command signals for the desired rotational positions of fins 1 and 2. The two fins of a pair are mounted to rest in their respective housings 3 and 16 that are positioned to be on the same side of missile body axis 11. The housings are mirrored on that side with axis 11 between them and are recessed into the body of the missile. Each of the fins has front end 18 and back end 17. In the preferred embodiment of DFCS as depicted in FIG. 2, the front ends of the fins are closer together than the back ends of the fins. When no lift effect is desired for the missile, the fins are completely retracted into their respective housings, thereby exposing no part outside missile skin 8. When flush with the surface of the missile skin as illustrated in View B of FIG. 1, no fin drag interferes with the aerodynamic properties of the missile's exterior configuration. When lift is desired, the fins are selectively exposed through the housing opening such that the movement vector of the fins is normal to the plane of the paper in FIG. 2.

When lift control for the missile flight is desired, an electrical command signal indicating the desired fin position is sent from the computer to electronic controller 15. The electronic controller also receives information relative to the current fin rotational position. The current fin rotational position may be determined by any suitable means, such as by using hall sensors located in drive motor 5. The hall sensors derive the current fin rotational position information by counting the hall pulses generated by drive motor 5. While other methods of deriving the current fin rotational position information exist, the hall pulse counting method has the advantage of being able to accommodate the space and weight constraints of a missile. It is noted, however, that the hall pulse counting method necessitates an initialization of the fins at the "zero" position to which all other determined positions are held relative. The zero position of the fins is illustrated in View B of FIG. 1. This is the stowed null-effect control position. To achieve the optimal operational efficiency of the DFCS during a flight and give the desired level of missile guidance lift force, fins 1 and 2 are variably positioned between the extreme positions illustrated in FIG. 1, Views A and B.

Electronic controller 15 which is coupled via wire connector 10 to drive motor 5 receives the current fin rotational position information from the drive motor and compares the information with the desired fin position command signal received from the guidance computer. From the comparison, an error signal is generated that is representative of a corrective angle and a voltage command corresponding to the corrective angle. This voltage is translated into rotation of the motor whose torque is delivered to transmission shaft 14 and, therefrom, simultaneously in opposite directions to both first fin gear shaft 13 and second fin gear shaft 19. The result is the rotation of fins 1 and 2 in opposite directions until the error signal is eliminated. The simultaneous transmission of the torque is accomplished by motor drive gear 7 which is coupled to first fin gear 6 and second fin gear 20. The first fin gear and second fin gear are, in turn, coupled to the first and second fin gear shafts, respectively. Because of the fins' alignment to the same motor drive gear 7, the rotation of the motor drive gear results in the rotation of the fins in mutually opposite directions. Motor transmission 4 "gears down" the rotational speed of the drive motor and multiplies the torque thereof prior to transmitting the torque to transmission shaft 14 that rotates motor drive gear 7. The motor transmission can take one of several gearing formats. Two that offer advantages of large gear ratios and small back lashes are a harmonic drive and a planetary drive.

The rotational movements of drive motor 5 from the neutral position in response to the error signals provides increasing control authority in proportion to the degree of rotational command given to the motor and in accordance with the rotational direction of the command. A clockwise error signal results in a voltage command that energizes the driving system (comprised of drive motor 5, motor transmission 4, first and second fin gears 6 and 20, first and second fin gear shafts 13 and 20, motor drive gear 7 and transmission shaft 14) to cause first fin 1 to be exposed outside missile skin 8 by rotating the fin by a pre-determined corrective angle while fin 2 is retracted into its corresponding housing by rotating it by the same pre-determined corrective angle. A counter-clockwise error signal results in a voltage command that reverses the rotational motions of the fins. With either error signals, the rotation of the fins continues until the error signal is reduced to zero. In all cases, the fins do not rotate beyond a pre-set maximum angle.

Figure 3:
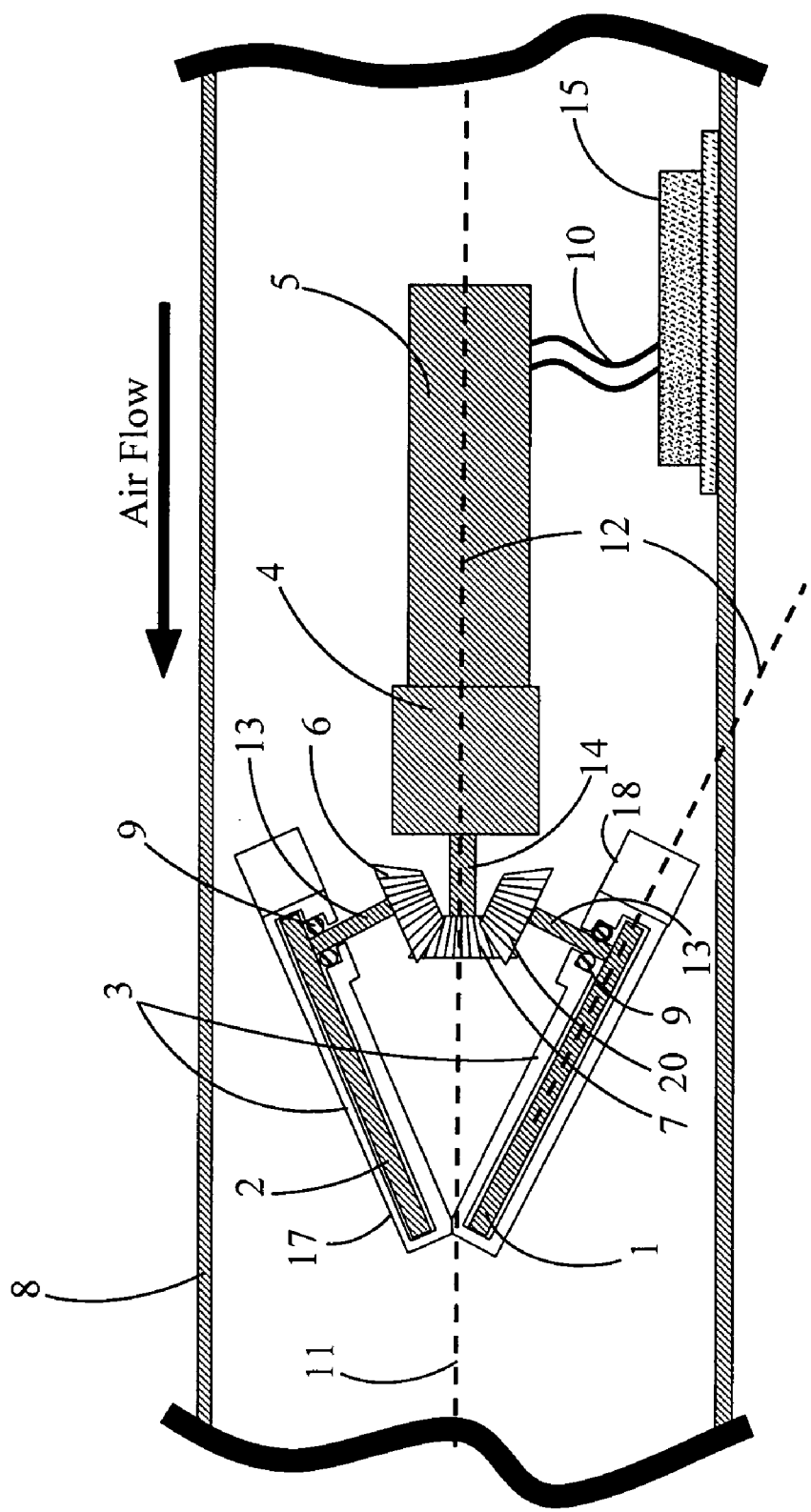
FIG. 3 depicts an alternate embodiment of the Dragless Flight Control System.
Figure 4:
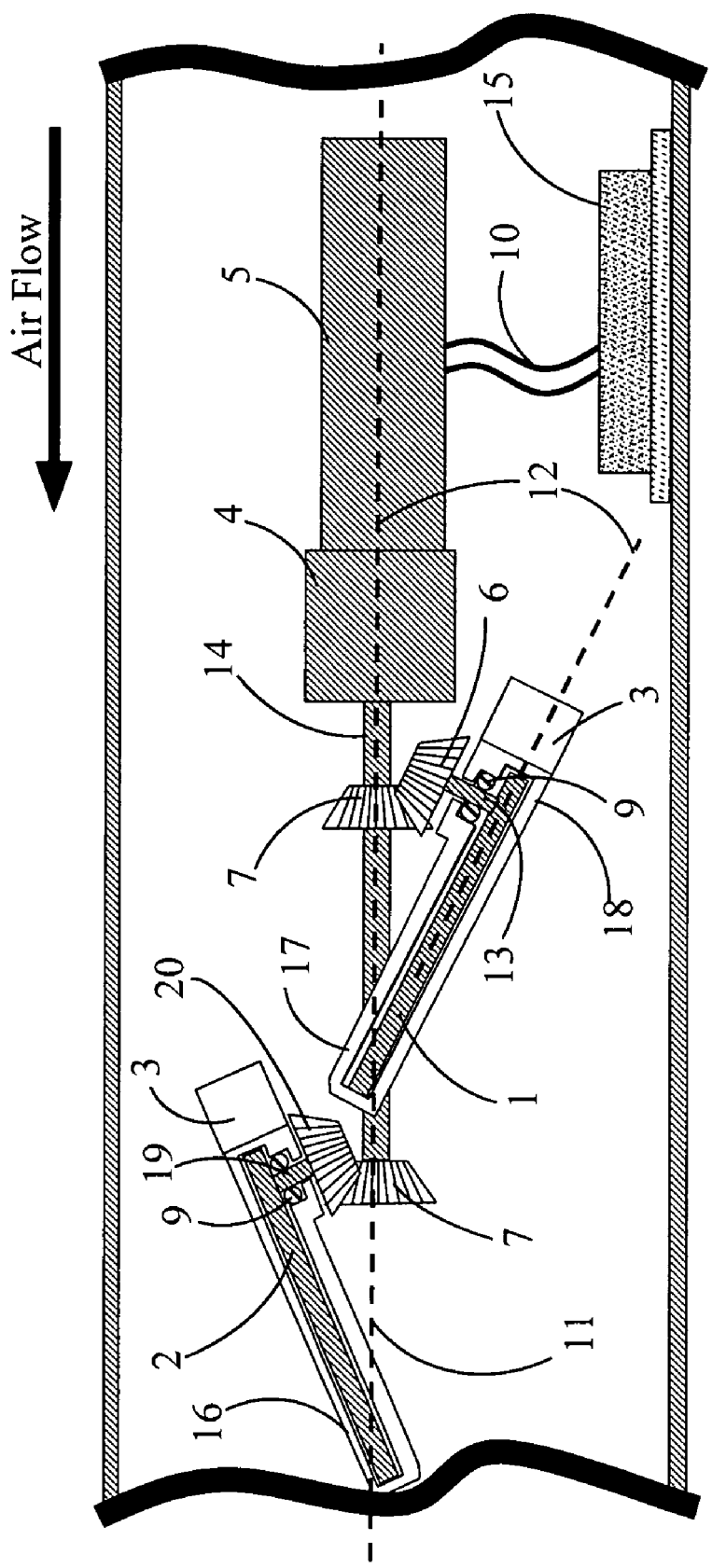
FIG. 4 shows yet a third embodiment of the Dragless Flight Control System.

FIG. 3 shows an alternate embodiment of the Dragless Flight Control System in which front ends 18 of the fins are further apart from each other than back ends 17 of the fins. FIG. 4 depicts yet another embodiment, that of fins in staggered positions. This positioning requires a separate motor drive gear for each fin. These alternate embodiments are equally effective in providing the desired actuation and the ultimate control of the fins and may differ only in their capability to meet a given space limitation in the flying object in which the DFCS is to be deployed.

Figure 5:
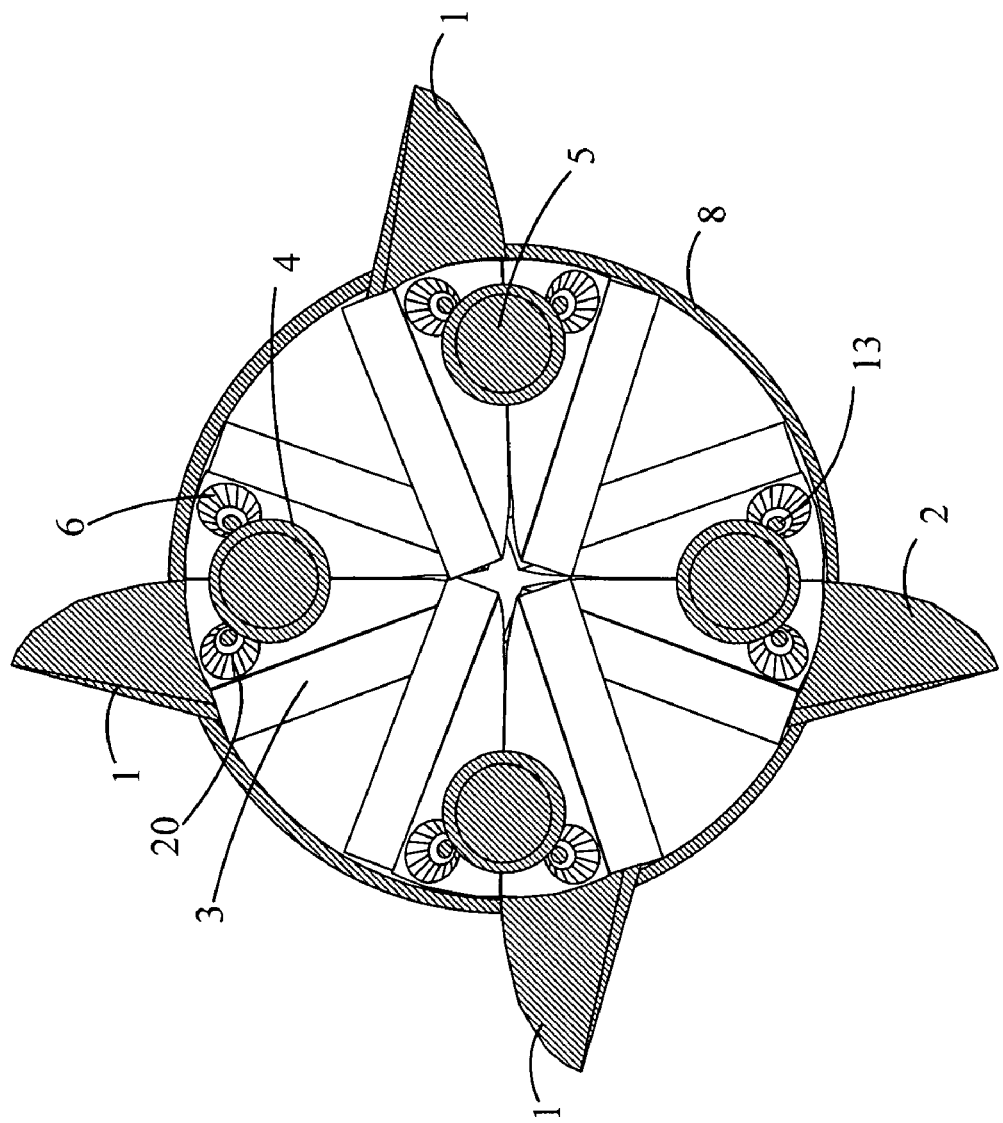
FIG. 5 shows the deployment of several pairs of fins on one flying object to control roll and yaw.
Figure 6:
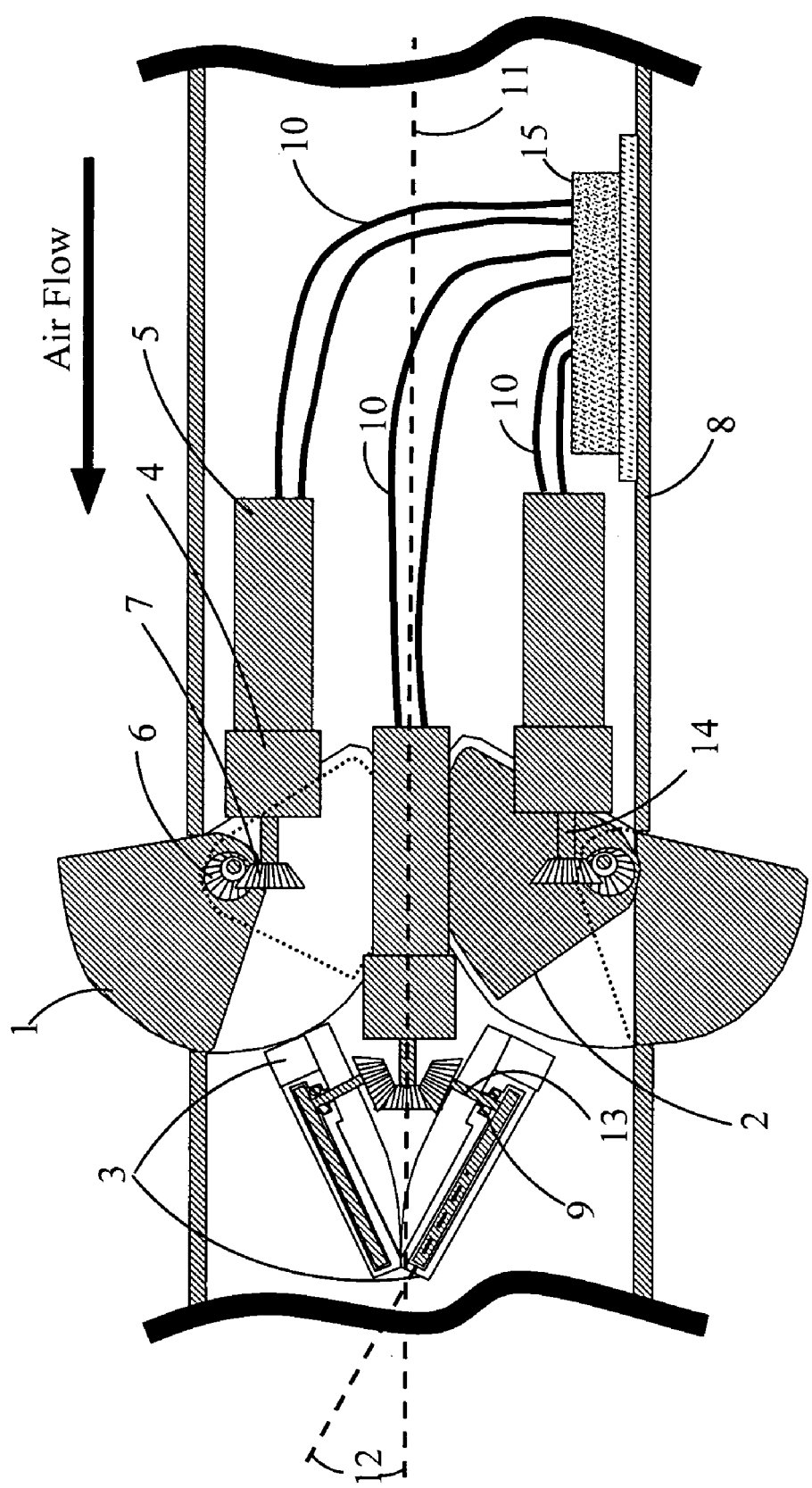
FIG. 6 illustrates an effective packaging of multiple pairs of fins by deploying the pairs in non-linear fashion around the circumference of the flying object.

The best effect of DFCS is achieved by using several pairs of the fins on one flying object, the pairs deployed at regular intervals from each other around the circumference of the object. Such a deployment is illustrated in a cross-sectional view of the object in FIG. 5. Matched fin pairs with fins actuated in parallel angles allow yaw maneuvers while matched pairs with fins actuated in non-parallel angles allow roll maneuvers. Further, combinations of different embodiments can be employed as shown in FIG. 6 for even more versatility.

Although particular embodiments and form of this invention have been illustrated, it is apparent that various modifications and other embodiments of the invention may be made by those skilled in the art without departing from the scope and spirit of the foregoing disclosure. For example, O-ring seals 9 can be used to seal fin gear shafts 13 and 19 rotationally with their respective housings 3 and 16. This permits avoidance of the external pressures that exist during the flight of the object. Further, the housings themselves may be sealed to skin 8 to prevent the external pressures from freely entering the flying object's body. Additionally, a pneumatic system, instead of direct electrical manipulation of the fins with electric motors as described above, may be used to introduce the fin pair into the air flow around the flying object. With the pneumatic system, the fin pair is introduced proportionally into the air flow in a piston-like arrangement that allows the fins to slide in a linear fashion into position rather than rotate into position. Control solenoids regulate the pressure and flow to the fin pistons that alternately position the fin pair at the desired height in the air flow. Some of the advantages of such a pneumatic arrangement are greater actuation forces and alternate uses for the pneumatic exhaust, such as driving corresponding thrusters for flight assistance during the transition from launch where fins have little control authority. On the other hand, disadvantages of the pneumatic system include reduced packaging efficiency and increased system complexity due to integration requirements attendant to electrical/mechanical systems. In accordance with the foregoing, the scope of the invention should be limited only by the claims appended hereto.

I claim:

1. A Dragless Flight Control System for controlling the flight of a flying object while minimizing drag, said control system residing in said object and said object being defined by an exterior skin and having a guidance computer therein for generating new positional command signal, said control system comprising: at least one pair of first housing and second housing, said housings being recessed inside said flying object and each having an opening communicating with said exterior skin; at least one pair of first and second fins positioned inside said housings, respectively, said fins each being exposable outside said exterior skin and being completely retractable into said housings through said openings, said first and second fins being mounted to rotate in mutually opposite directions and to have rotation vectors normal to said exterior skin, said fins further being rotatable by variable corrective angles; a means for ascertaining current rotational position of said fins; an electronic controller coupled between said ascertaining means and said guidance computer, said controller generating a signal representative of a corrective angle in response to current rotational position information from said ascertaining means and said command signal from said computer, said controller then further producing a voltage command corresponding to said corrective angle; a drive motor coupled to said electronic controller to receive said voltage command and generate a corresponding torque; a first motor drive gear; a second motor drive gear; a motor transmission coupled between said drive motor and said motor drive gears to multiply said torque selectively prior to delivering said torque to said motor drive gears; a first fin gear shaft and a second fin gear shaft, said fin gear shafts being rotationally coupled to their respective fins so as to allow said fins to rotate; a first fin gear coupled between said first fin gear shaft and said first motor drive gear to transmit said torque from said first motor drive gear to said first fin gear shaft to enable said first fin gear shaft to rotate said first fin; and a second fin gear coupled between said second fin gear shaft and said second motor drive gear to transmit said torque from said second motor drive gear to said second fin gear shaft to enable said second fin gear shaft to rotate said second fin, said first and second fins always rotating simultaneously but in opposite directions, thereby exposing one fin while retracting the other fin until said corrective angle is obtained, thereby achieving desired degree of control of said object's flight.

2. A Dragless Flight Control System as set forth in claim 1, wherein said first and second fins are positioned staggered with respect to each other.

3. A Dragless Flight Control System as set forth in claim 2, wherein said control system further comprises two O-ring seals, each seal being coupled to one of said fin gear shafts inside its corresponding housing to render stability to said fin gear shaft.

4. A Dragless Flight Control System as set forth in claim 3, wherein said control system still further comprises a transmission shaft coupled between said motor transmission and said motor drive gears.

5. A Dragless Flight Control System as set forth in claim 4, wherein said means for ascertaining current rotational position of said fins is a hall sensor located in said drive motor, said sensor deriving said current rotational position by counting hall pulses generated by said motor.

6. A Dragless Flight Control System as set forth in claim 5, wherein said flight control system still further comprises several pairs of said fins, said several pairs being deployed at regular intervals around the circumference of said flying object.

* * * * *